United States Patent [19]

Scheele et al.

[11] Patent Number: 5,199,762
[45] Date of Patent: Apr. 6, 1993

[54] SQUARE-BACKED VEHICLE AIR FOIL SYSTEM

[76] Inventors: Rick L. Scheele, P.O. Box 381; Dennis I. Nelson, P.O. Box 741, both of Darby, Mont. 59829

[21] Appl. No.: 801,711

[22] Filed: Dec. 2, 1991

[51] Int. Cl.$^5$ .......................... B62D 35/00; B60J 1/20
[52] U.S. Cl. ................... 296/180.1; 296/91; 296/96.15; 296/180.4
[58] Field of Search ............... 296/96.15, 180.1, 180.4, 296/180.5, 91; 239/589

[56] References Cited

U.S. PATENT DOCUMENTS

| | | | |
|---|---|---|---|
| 3,999,797 | 12/1976 | Kirsch et al. | 296/180.4 |
| 4,320,920 | 3/1982 | Goude | 296/180.4 |
| 4,603,810 | 8/1986 | Schleimer et al. | 239/589 X |
| 4,674,788 | 6/1987 | Ohmura et al. | 296/91 X |
| 4,881,772 | 11/1989 | Feinberg | 296/180.1 |

FOREIGN PATENT DOCUMENTS

| | | | |
|---|---|---|---|
| 749596 | 7/1933 | France | 296/91 |
| 2594497 | 9/1987 | France | 296/180.1 |
| 1066371 | 4/1967 | United Kingdom | 296/91 |
| 1215688 | 12/1970 | United Kingdom | 296/91 |

Primary Examiner—Dennis H. Pedder
Attorney, Agent, or Firm—Wells, St. John, Roberts, Gregory & Matkin

[57] ABSTRACT

The specification describes a preferred embodiment of the square-backed vehicle air foil 10 for attaching to a vehicle 12 adjacent an upper rear edge 21 for projecting into a horizontal airstream "S" for subdividing the airstream into an inner or first airstream layer $S_1$ and an outer or second airstream layer $S_2$. The assembly 10 has an inner air foil element 32 that directs the first airstream layer rearward and then rearward and downward over the rear edge 21 and then downward at a first velocity along the rear vehicle panel 21 to form a first air curtain along the rear panel to keep the rear panel clean. The assembly 10 has an outer air foil element 34 that, in cooperation with the inner foil element 32, directs the second airstream layer $S_2$ rearward along the roof panel while accelerating the layer $S_2$. The layer $S_2$ then is directed rearward and downward over the rear edge 21 and is then directed downward along the rear panel at a higher velocity than the first layer forming a second air curtain for keeping the rear panel clean. A frame 30 attaches the assembly 10 to the vehicle 12 projecting the inner and outer foil elements 32, 34 into the airstream to receive the first and second airstream layers $S_1$ and $S_2$. The mounting frame 30 provides for longitudinal and transverse adjustment of the assembly 10.

36 Claims, 4 Drawing Sheets

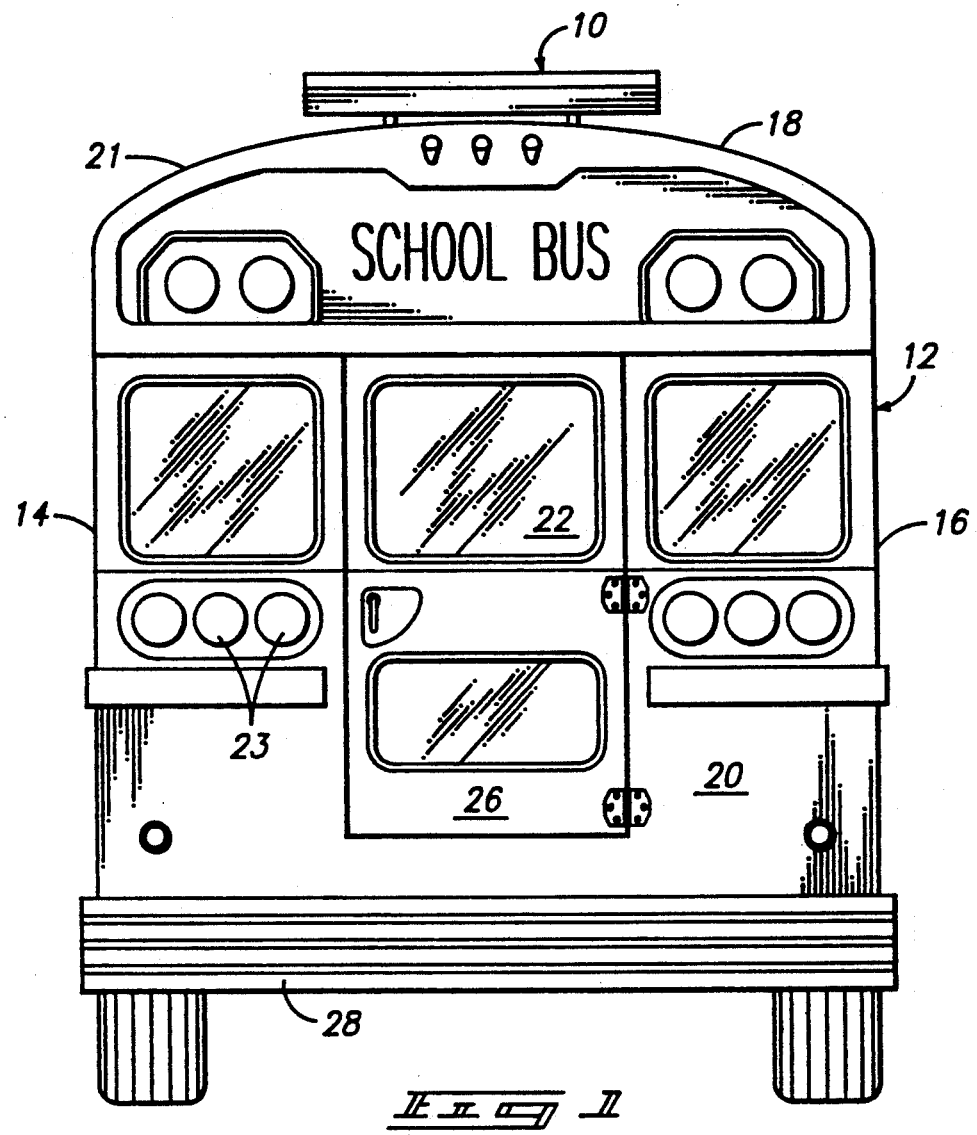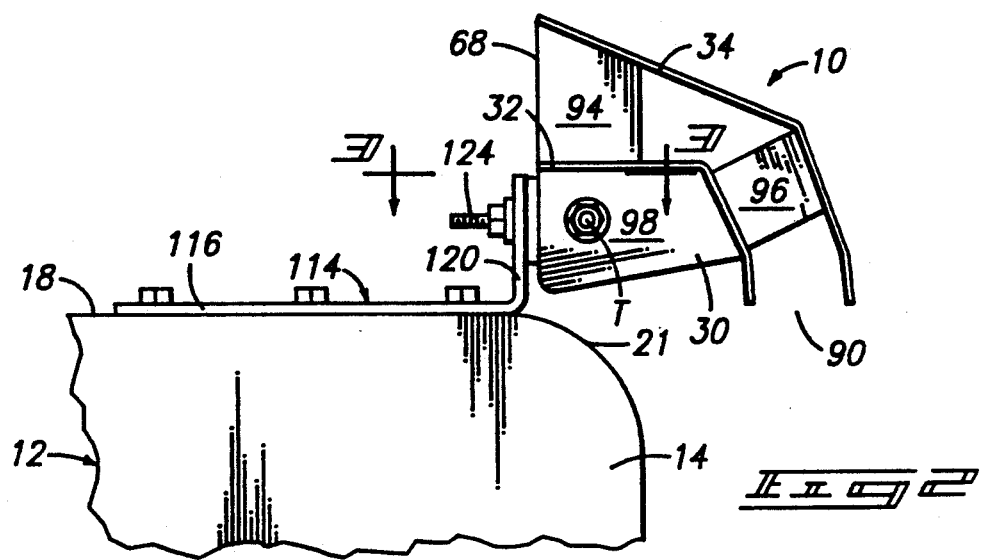

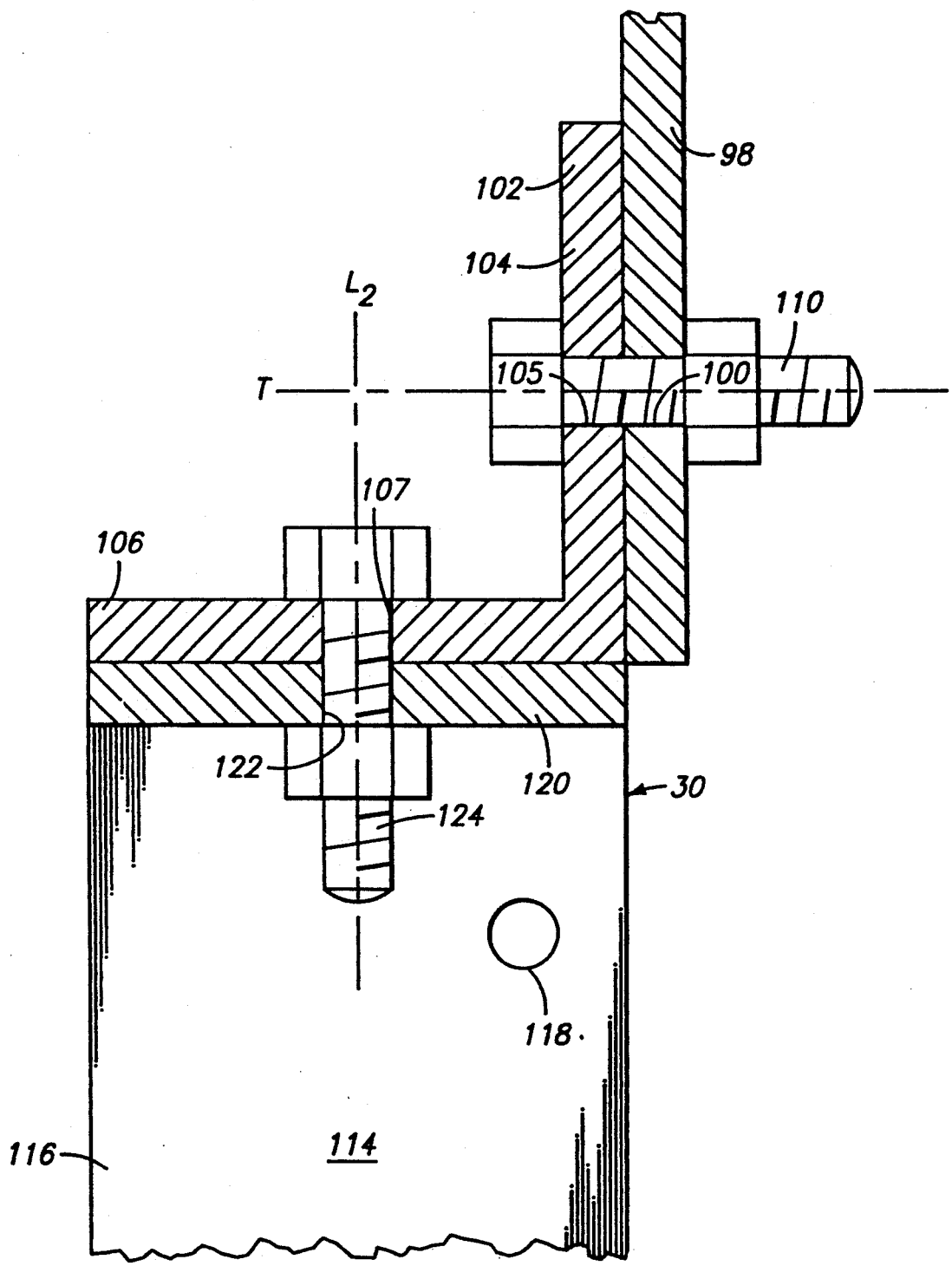

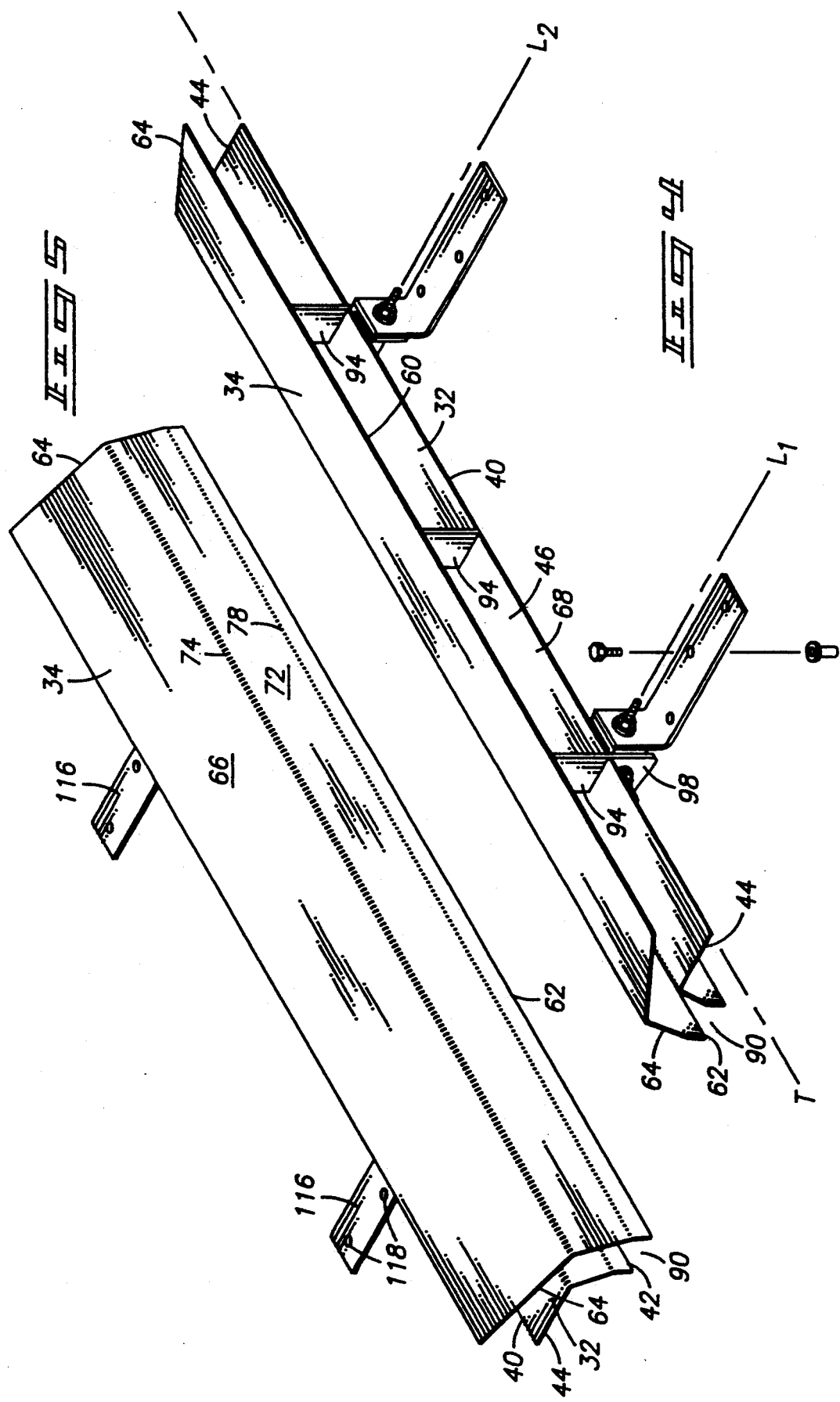

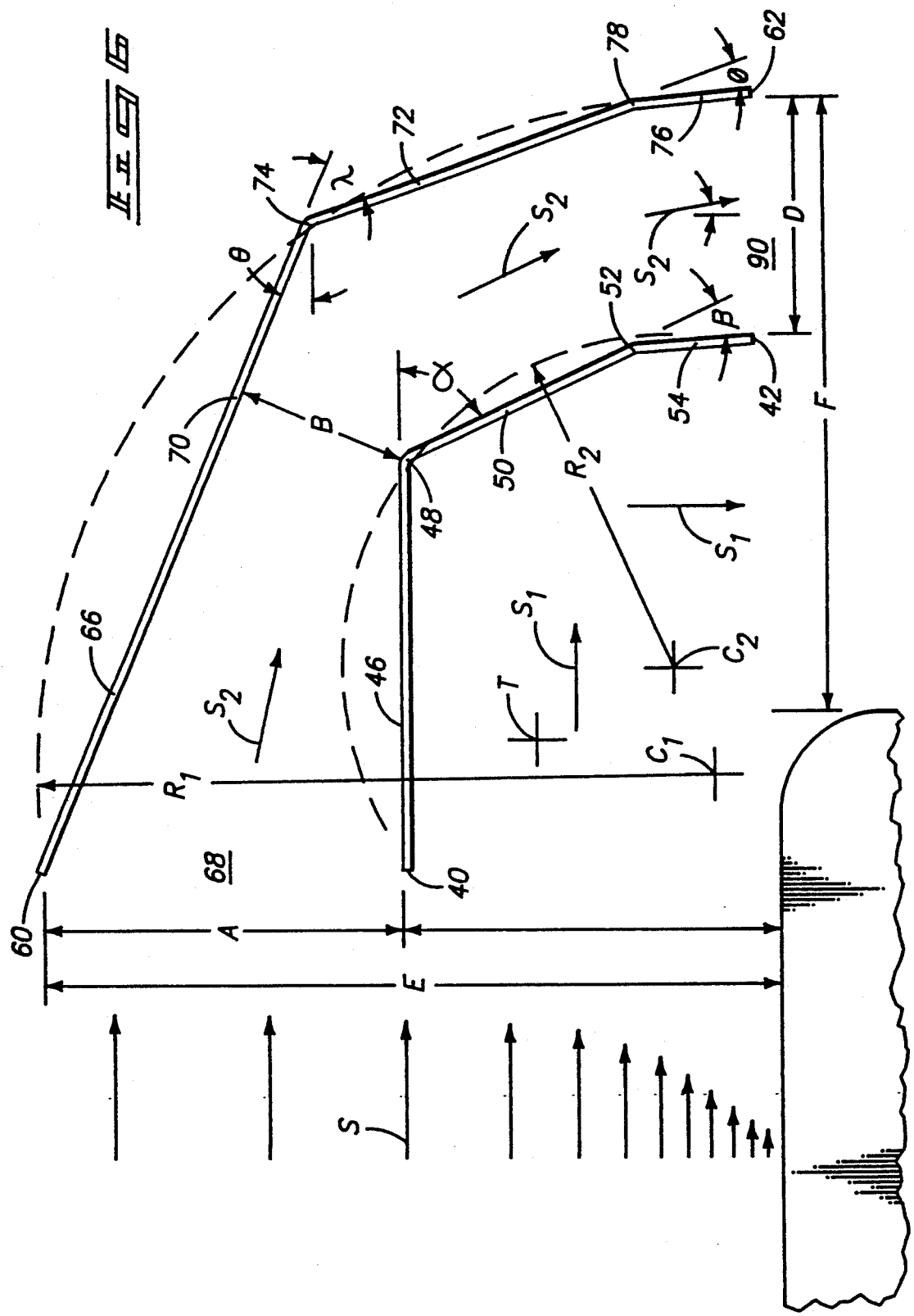

SQUARE-BACKED VEHICLE AIR FOIL SYSTEM

TECHNICAL FIELD

This invention relates to air foil systems for attaching to the upper rear edge of a square-backed vehicle to direct air over the upper rear edge and downwardly along a rear panel of the vehicle to keep the rear panel clean.

BACKGROUND OF THE INVENTION

It is quite common for square-backed vehicles to collect, depending upon the weather and road conditions, undesirable particulate material such as dirt, dust, grim, mud and snow on a rear panel of the vehicle. Such square-backed vehicles generally include such land vehicles as buses, vans, semi-trailers, motor homes, travel trailers and a wide variety of trucks.

The problem is caused by the aerodynamic shape of a square-backed vehicle in which the parallel airstreams passing over the side, roof and bottom panels of the vehicle create a vacuum immediately behind the rear vehicle panel causing turbulent swirling eddy currents that pull the undesirable roadway particulate material upward depositing the particulate material on the rear panel.

The problem is particularly serious and presents a safety hazard when the deposited undesirable particulate material hampers a driver from having clear vision through a window in the rear panel. Furthermore, it is not unusual for the deposited particulate material to cover and obscure rear lights of the vehicle increasing the probability that the vehicle may be involved in a rear end accident.

The problem has been known for many years and a wide variety of solutions have been proposed and implemented. Such solutions include using a wide variety of air deflectors and air foils incorporated in or attached to the rear part of the vehicle for deflecting one or more of the parallel airstreams inward along the rear panel. Many of such prior deflectors or air foils, although partially effective, were cumbersome and created additional drag that lowers fuel efficiency of the vehicle. Some of the attached deflectors had insufficient strength and were easily deformed and over time broke creating safety hazards. An additional solution that has been proposed has been to attach pyramid or conical shaped projections over the rear panel that extend rearward to minimize the creation of a vacuum at the rear of the square-backed vehicle.

One of the principle objects of this invention is to provide an improved air foil system for attaching to the upper rear edge of a square-backed vehicle that is not only more effective in maintaining the rear panel free from undesirable particulate material but also increases the fuel efficiency of the vehicle.

These and other objects and advantages of this invention will become apparent upon reading a detailed description of a preferred embodiment.

BRIEF DESCRIPTION OF THE DRAWINGS

Preferred embodiments of the invention are described below with reference to the accompanying drawings, which are briefly described below.

FIG. 1 is a rear elevational view of a rear panel of a school bus with a preferred embodiment of the air foil assembly mounted adjacent a rear upper edge of the bus;

FIG. 2 is a side elevational view of the air foil assembly illustrated in FIG. 1 showing the air foil assembly attached to the bus and extending over the upper rear edge of the bus;

FIG. 3 is a fragmentary horizontal cross-sectional view taken along line 3—3 in FIG. 2 illustrating a bracket assembly for supporting the air foil assembly;

FIG. 4 is an isometric front view of the air foil assembly;

FIG. 5 is an isometric rear view of the air foil assembly;

FIG. 6 is a schematic side elevational view of the air foil elements in relation to the upper rear edge of the bus illustrating the flow of air along the air foil elements.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Referring in detail to the drawings, a preferred embodiment of the square-backed vehicle air foil assembly is illustrated in FIG. 1 and designated generally with the numeral 10. The assembly is mounted on a square backed vehicle generally identified with the numeral 12. Such square-backed vehicles 12 generally include buses, semi-trailers, vans, station wagons, motor homes, travel and utility trailers and a wide variety of trucks. Common features of square-backed vehicles include side panels 14 and 16, a roof panel 18 and a rear panel 20 in which the rear panel is substantially upright and interconnects with the side and roof panels at substantially right angles. Such vehicles are generally referred to as "square-backed" vehicles. The rear panel 20 intersects with the roof panel along a transverse upper rear edge or corner 21. The present invention is particularly applicable and advantageously used on school buses, such as the one illustrated in FIG. 1.

Some of the rear panels 20, particularly those of buses, station wagons, travel trailers, and motor homes, have rear windows 22 that are used for rear viewing. Additionally such vehicles have rear or tail lights and/or running lights 23 so that a driver of a following vehicle can clearly identify the location of the vehicle. Some of such vehicles 12 have rear safety doors 26. Almost all of such vehicles 12 have a rear bumper 29 near the bottom of rear panel 20.

The assembly 10 includes a mounting means or assembly frame generally designated with the numeral 30 and an elongated inner air foil element 32 and an elongated outer air foil element 34. Preferably, both of the air foil elements 32 and 34 are formed of sheet material having a substantially uniform thickness. Applicant has successfully used 14 gauge sheet steel that is coated with a protective and rust resistant coating. Preferably both the inner and outer foil elements 32, 34 are quite wide and extend a distance that is greater than one-half the width of the vehicle 12, but less than the full width of the vehicle, as illustrated in FIG. 1. Front and back isometric views of the assembly 10 are shown in FIGS. 4 and 5.

The inner air foil element 32, illustrated in FIG. 6, extends in a general arcuate manner from a front or entrance edge 40 to a exit or rear edge 42. The element 32 extends in a generally straight manner between side edges 44. The element 32 has a substantially planar entrance portion or section 46 that extends generally horizontally rearward from the entrance edge 40 to a sheet material bend 48. The bend 48 has an angle $\alpha$ of approximately 65 degrees. From the bend 48, the element 32 has a substantially planar transition portion or section 50 that extends rearward and downward to a bend 52. The bend 52 has an angle $\beta$ of approximately 21 degress. From the bend 52, the element 32 has a substantially planar exit portion or section 54 that extends downward terminating in the exit edge 42. It should be noted that the exit portion 54 extends partially rearward at an angle of about 4–5 degrees to vertical.

The elongated outer air foil 34 extends is an generally arcuate manner from a front or entrance edge 60 to an exit or rear edge 62. Laterally, the outer air foil 34 extends in a substantially straight manner between side edges 64. The element 34 has a substantially planar inclined entrance portion or section 66 that extends generally horizontally rearward and downward from the entrance edge 60 to a restriction section 70. Preferably the entrance portion 66 extends rearward and downward at an inclined angle $\theta$ relative to the entrance portion 46 of the inner air foil of between 20 degrees and 25 degrees, and preferably at approximately 23 degrees.

Between the entrance edges 40 and 60, a mouth or entrance 68 is defined having a prescribed cross-sectional area 68, the height of which is designated with the letter "A". From the mouth 68 the cross-sectional area between the inner and outer air foils 32, 34, progressively decreases to the restriction section 70. At the restriction section the minimum cross-sectional area is designated with the letter "B". Preferably the minimum cross-sectional area "B" at the restriction section or throat 70 is between 40% and 60% of the mouth cross-sectional area "A" and more particularly approximately 50%.

From the restriction section 70, the outer air foil 34 has a transition portion or divergent section 72 that expands linearly in cross-sectional area to a sheet material bend 74. The bend 74 has an angle $\lambda$ of approximately 49–50 degrees. From the bend 74, the transition portion 72 extends rearward and downward to a bend 78. The bend 78 has an angle $\phi$ of approximately 13–15 degrees. From the bend 78, the element 34 has a substantially planar exit portion or section 76 that extends downward terminating in the exit edge 62. It should be noted that the exit portion extends partially rearward at an angle of about 4–6 degrees to vertical.

An exit 90 is formed between the exit edges 42 and 62 having a cross-sectional area designated with the letter "D". Preferably the cross sectional area "D" is between 60% and 75% of the mouth cross-section "A", particularly 67%.

The outer air foil 34, as illustrated in FIG. 6, has an effective radius of curvature $R_1$ extending from a center of curvature $C_1$ and passing in an arc through the entrance edge 60, bend 74 and exit edge 62. The inner air foil 32 has an effective radius of curvature $R_2$ extending from a center of curvature $C_2$ and passing in an arc through the entrance edge 40, bend 48 and exit edge 42. As illustrated in FIG. 6, the centers of curvatures $C_1$ and $C_2$ are located rearward of the entrance 68 and upward from the exit 90.

The frame 30 has vertical forward gussets 94 (FIG. 4) that extend between the entrance portions 46 and 66 at laterally spaced locations, preferably three locations, to maintain the inner and outer air foils properly spaced with respect to each other. Additionally the frame 30 includes spaced rear vertical gussets 96 (FIG. 2) that extend between the transition portions 50 and 72 to maintain the inner and outer air foils properly spaced and rigid with respect to each other. The gussets 94 and 96 have a very narrow front profile to minimize air resistance while still providing the proper rigid spacing of the inner and outer foils.

The frame 30 further includes laterally spaced mounting gussets 98 (FIGS. 2-4) that are affixed to the inner air foil to facilitate the mounting of the assembly adjacent the rear edge 21 of the vehicle. The mounting gussets 98 each have a tilt aperture 100 (FIG. 3) formed therein defining a transvere tilt axis "T". The frame 30 further includes "L" shaped tilt adjustment brackets 102 for attaching to the mounting gussets 98. The tilt brackets 102 include a plate 104 with an aperture 105 corresponding with the aperture 100 for receiving a tilt fastener 110, such as a bolt and nut to adjust the angular position of the air foils 32, 34 relative to the transverse axis "T". The tilt brackets 102 has plates 106 perpendicular to the plates 104 with apertures 109 formed therein defining longitudinal axis $L_1$ and $L_2$ (FIG. 4).

To attach the assembly 10 to the vehicle, the frame 30 includes anchor brackets 114 that have elongated plate sections 116 with anchor apertures 118 formed therein and upright plate sections 120 with longitudinal apertures 122 formed therein for matching with the apertures 102. Mounting fasteners such as bolts 124 extend through the apertures 102 and 122 for enabling the anchor brackets 114 to be adjusted about respective longitudinal $L_1$ and $L_2$ axes to adjust the brackets 114 to the contour of the roof panel 18 adjacent the rear edge 21. Such a feature enables the assembly 10 to be mounted to almost any square-backed vehicle independent of the contour of the its roof panel. The assembly 10 is mounted so that the exit 90 is rearward of the rear panel by a distance "F". Preferably the distance "F" is greater than 5 inches for school buses.

As illustrated in FIG. 6, an airstream "S" (generally horizontal) flows over the roof panel 18. The airstream "S" immediately adjacent the roof panel generally includes a highly turbulent low velocity layer commonly referred to as "dead" layer. Further spaced from the roof panel 18, the flow of the airstream is less turbulent and more laminar having a velocity comparable to the velocity of the vehicle (assuming no wind). The mounting means 30 supports the assembly upward of the roof panel 18 a sufficient distance "E" so that the entrance portion 46 of the inner air foil 32 projects into the laminar flow of the airstream "S" to subdivide the airstream into an inner or first airstream layer $S_1$ and an outer or second airstream layer $S_2$. The inner airstream $S_1$ is directed rearward between the roof panel 18 and the entrance portion 46 and then rearward and downward over the rear edge 21 along the transition portion 50 and then downward between the rear panel 20 and the exit portion 54 creating an inner layer or curtain of air to wash along the rear panel to maintain the rear panel clean from particulate material. The velocity of the inner layer $S_1$ as it leaves the exit portion 54 is substantially equal to or less than the velocity of the airstream "S".

The second airstream layer $S_2$ entering the mouth 68 is directed rearward from the mouth 68 to the restriction section 70. The second layer $S_2$ is progressively compressed and accelerated as the layer passes between the entrance portions 46 and 66. The second layer $S_2$ is then directed rearward and downward with a slight expansion as the layer passes between the transition portions 50 and 72. The second layer $S_2$ is then directed downward exiting at the exit 90 at a velocity greater than the velocity of the first layer $S_1$ and preferably greater than the velocity of the airstream "S". The high velocity second layer $S_2$ is directed downward over the rear panel parallel with the first layer $S_1$ forming a second air curtain to further wash the rear panel and to maintain the rear panel clean of particulate material. It has been found that the second curtain is able to extend downward along the rear panel 20 to the bumper 28 maintaining the rear panel clear of undesirable particulate material. Such results have been exceeding beneficial for school buses not only in decreasing the amount of cleaning maintenance required, but also increasing safety.

Surprisingly and unexpectedly, it has also been found that the assembly 10 when properly installed enables the vehicle to be more fuel efficient by increasing the gas mileage per gallon of fuel (gasoline or diesel). The degree of fuel economy varies greatly with the average speed of the vehicle and the type of roads being traveled. Nonetheless, significant fuel economy results have been obtaining using the assembly 10.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A square-backed vehicle air foil system for attachment to an upper rear edge of a square-backed vehicle to project into a horizontal airstream passing over a roof panel of the vehicle as the vehicle is propelled over a roadway to deflect and direct two layers of the airstream over the upper rear edge and downward along a rear panel of the vehicle to provide two moving air curtains over the rear panel to maintain the rear panel clean, comprising:
    a) an elongated inner air foil element for extending along the upper rear edge in which the air foil element extends between an entrance edge and an exit edge;
    b) an elongated outer air foil element complementary to and spaced from the inner air foil element for extending along the upper rear edge in which the outer foil element extends between an entrance edge and an exit edge with the entrance edge of the outer air foil element being displaced above the entrance edge of the inner air foil element and the exit edge of the outer air foil element being displaced rearward of the exit edge of the inner air foil element;
    c) mounting means operatively connected to the inner and outer air foil elements for attaching the air foil elements to the square-backed vehicle along the upper rear edge with the entrance edges displaced at different elevations above the upper rear edge of the vehicle and projecting into the horizontal airstream passing over the roof panel of the vehicle and the exit edges of the air foils displaced at different distances rearward of the rear panel of the vehicle (1) for subdividing the airstream into layers and for deflecting and directing a first layer of the airstream along an inside surface of the inner air foil element over the upper rear edge of the vehicle and downward along and immediately adjacent the rear panel of the vehicle at a first velocity to provide a first moving air curtain over the rear panel to maintain the rear panel clean and (2) for deflecting and directing a second layer of the airstream between the inner air foil element and the outer air foil element over the upper rear edge of the vehicle and downward along the rear panel adjacent the first layer, at a second velocity greater than the first velocity, to provide a second moving air curtain to maintain the rear panel clean.

2. The square-backed vehicle air foil system as defined in claim 1 wherein the mounting means and the inner and outer air foil elements form a convergent-divergent nozzle for receiving the second layer of the airstream at a forward projecting nozzle mouth having a prescribed cross-sectional mouth area and for accelerating the second layer along a convergent section and for deflecting and directing the accelerated second layer downward along a divergent section and for discharging the accelerated second layer from a nozzle exit at the second velocity to provide the second moving air curtain.

3. The square-backed vehicle air foil system as defined in claim 2 wherein the convergent-divergent nozzle has a restricted section intermediate the nozzle mouth and the nozzle exit that has a prescribed restricted cross-sectional area that is between 40% and 60% of the prescribed cross-sectional area of the mouth.

4. The square-backed vehicle air foil system as defined in claim 3 wherein the prescribed restricted cross-sectional area is approximately one-half of the prescribed cross-sectional area of the mouth.

5. The square-backed vehicle air foil system as defined in claim 1 wherein at least one of the air foil elements is formed from sheet metal and has a uniform thickness.

6. The square-backed vehicle air foil system as defined in claim 1 wherein each of the foil elements have complementary (1) entrance portions that extend rearward from an entrance, (2) transition portions that extend rearward and downward, and (3) exit portions that extend downward to an exit.

7. The square-backed vehicle air foil system as defined in claim 6 wherein the entrance portion of the inner air foil element is substantially parallel with the roof panel for subdividing the first and second layers of the airstream.

8. The square-backed vehicle air foil system as defined in claim 6 wherein the entrance portion of the outer air foil element is inclined to the airstream to compress the second layer of the airstream as the second layer is directed rearward.

9. The square-backed vehicle air foil system as defined in claim 7 wherein the entrance portion of the outer air foil element is inclined at a prescribed angle relative to the entrance portion of the inner air foil element to progressively compress and accelerate the second layer of the airstream therebetween as the second layer is directed rearward to the transition portions.

10. The square-backed vehicle air foil system as defined in claim 9 wherein the prescribed inclined angle of the entrance portion of the outer air foil element relative to the entrance portion of the inner air foil element is between 20 degrees and 25 degrees.

11. The square-backed vehicle air foil system as defined in claim 9 wherein the prescribed inclined angle of the entrance portion of the outer air foil element relative to the entrance portion of the inner air foil element is approximately 23 degrees.

12. The square-backed vehicle air foil system as defined in claim 6 wherein each of the air foil elements extends in a respective rearward and downward arcuate segment between its entrance edge, an intermediate bend, and its exit edge defining respective arcs intersecting its entrance edge, its intermediate bend, and its exit edge, in which the arc of the inner air foil element has a radius of curvature ($R_2$) that is less than a radius of curvature ($R_1$) of the arc of the outer air foil.

13. The square-backed vehicle air foil system as defined in claim 12 wherein the radius of curvature ($R_2$) of the arc of the inner air foil element has a center of curvature ($C_2$) rearward of its entrance edge and upward from its exit edge.

14. The square-backed vehicle air foil system as defined in claim 12 wherein the radius of curvature ($R_1$) of the arc of the outer air foil element has a center of curvature ($C_1$) rearward of its entrance edge and upward from its exit edge.

15. The square-backed vehicle air foil system as defined in claim 12 wherein the radius of curvatures of both the arcs of the inner and outer air foil elements have corresponding centers of curvatures rearward of their respective entrance edges and upward from their respective exit edges.

16. The square-backed vehicle air foil system as defined in claim 1 wherein the mounting means includes anchor brackets for attaching the assembly to the vehicle adjacent the upper rear edge in which the brackets are adjusted about parallel axes relative to a longitudinal axis of the vehicle to adjust the brackets to a transverse contour of the vehicle adjacent the upper rear edge.

17. The square-backed vehicle air foil system as defined in claim 16 wherein the mounting means further includes tilt adjustment brackets supporting the inner and outer air foil elements and for enabling the air foil elements to be angularly adjusted about a transverse axis substantially parallel with the upper rear edge of the vehicle.

18. The square-backed vehicle air foil system as defined in claim 6 wherein the air foil elements are formed of sheet material having uniform thickness.

19. A square-backed vehicle air foil system for attachment to an upper rear edge of a square-backed vehicle to project into a horizontal airstream passing over a roof panel of the vehicle as the vehicle is propelled over a roadway to deflect and direct two layers of the airstream over the upper rear edge and downward along a rear panel of the vehicle to provide two moving air curtains over the rear panel to maintain the rear panel clean, comprising:

a) an elongated inner air foil sheet material element for extending along the upper rear edge having (1) an entrance portion extending rearward from an entrance edge for subdividing the airstream into layers and directing a first layer rearward over the upper rear edge, (2) a transition portion deflecting and directing the first layer of the airstream, and (3) an exit portion for directing the deflected first layer downward from an exit edge along and immediately adjacent the rear panel at a first velocity to provide a first moving air curtain over the rear panel to maintain the rear panel clean;

b) an elongated outer air foil sheet material element complementary to and spaced from the inner air foil element for extending along the upper rear edge having (1) an entrance portion displaced above the entrance portion of the inner air foil element extending rearward from an entrance edge for receiving a second layer of the airstream and for accelerating the second layer rearward, (2) a transition portion for deflecting the accelerated second layer downward; and (3) an exit portion displaced rearward of the transition portion of the inner air foil element for directing the deflected second layer downward from an exit edge along the rear panel adjacent the first layer, at a second velocity greater than the first velocity, to provide a second moving air curtain to maintain the rear panel clean;

c) mounting means operatively connected to the inner and outer air foil elements for attaching the air foil elements to the square-backed vehicle along the upper rear edge with the entrance edges displaced at different elevations above the upper rear edge of the vehicle and projecting into the horizontal airstream passing over the roof panel of the vehicle for subdividing the airstream into the first layer and second layer.

20. The square-backed vehicle air foil system as defined in claim 19 wherein the inner and outer air foil elements and the mounting means form a convergent-divergent nozzle for receiving the second layer of the airstream in which the entrance portion of the outer element has a prescribed cross-sectional entrance area and for accelerating the second layer along the convergent-divergent nozzle.

21. The square-backed vehicle air foil system as defined in claim 20 wherein the convergent-divergent nozzle has a restricted section intermediate the entrance portions and the exit portions that has a prescribed restricted cross-sectional area that is between 40% and 60% of the prescribed cross-sectional area of the entrance.

22. The square-backed vehicle air foil system as defined in claim 21 wherein the prescribed restricted cross-sectional area is approximately one-half of the prescribed cross-sectional area of the entrance.

23. The square-backed vehicle air foil system as defined in claim 21 wherein the exit has a prescribed cross-sectional area that is larger than the prescribed restricted cross-sectional area.

24. The square-backed vehicle air foil system as defined in claim 19 wherein the entrance portion of the inner air foil element is substantially parallel with the roof panel for subdividing the first and second layers of the airstream.

25. The square-backed vehicle air foil system as defined in claim 19 wherein the entrance portion of the outer air foil element is inclined to the airstream to compress the second layer of the airstream as the second layer is directed rearward.

26. The square-backed vehicle air foil system as defined in claim 25 wherein the entrance portion of the outer air foil element is inclined at a prescribed angle relative to the entrance portion of the inner air foil element to progressively compress and accelerate the second layer of the airstream therebetween as the second layer is directed rearward to the transition portions.

27. The square-backed vehicle air foil system as defined in claim 26 wherein the prescribed inclined angle of the entrance portion of the outer air foil element relative to the entrance portion of the inner air foil element is between 20 degrees and 25 degrees.

28. The square-backed vehicle air foil system as defined in claim 26 wherein the prescribed inclined angle of the entrance portion of the outer air foil element relative to the entrance portion of the inner air foil element is approximately 23 degrees.

29. The square-backed vehicle air foil system as defined in claim 19 wherein each of the air foil elements extend in a respective rearward and downward arcuate segment between its entrance edge, an intermediate bend, and its exit edge defining respective arcs intersecting its entrance edge, its intermediate bend and its exit edge, in which the arc of the inner air foil element has a radius of curvature ($R_2$) that is less than the radius of curvature ($R_1$) of the arc of the outer air foil.

30. The square-backed vehicle air foil system as defined in claim 29 wherein the radius of curvature ($R_2$) of the arc of the inner air foil element has a center of curvature ($C_2$) rearward of its entrance edge and upward from its exit edge.

31. The square-backed vehicle air foil system as defined in claim 29 wherein the radius of curvature ($R_1$) of the arc of the outer air foil element has a center of curvature ($C_1$) rearward of its entrance edge and upward from its exit edge.

32. The square-backed vehicle air foil system as defined in claim 29 wherein the radius of curvatures of both the arcs of the inner and outer air foil elements have corresponding centers of curvatures rearward of their respective entrance edges and upward from their respective exit edges.

33. The square-backed vehicle air foil system as defined in claim 19 wherein the mounting means includes anchor brackets for attaching the assembly to the vehicle adjacent the upper rear edge in which the brackets are adjusted about parallel axes relative to a longitudinal axis of the vehicle to adjust the anchor brackets to a transverse contour of the vehicle adjacent the upper rear edge.

34. The square-backed vehicle air foil system as defined in claim 19 wherein the mounting means includes tilt adjustment brackets supporting the inner and outer air foil elements and for enabling the air foil elements to be angularly adjusted about a transverse axis substantially parallel with the upper rear edge of the vehicle.

35. The square-backed vehicle air foil system as defined in claim 1 wherein each of the air foil elements extends between its entrance edge and exit edge a respective preset distance and wherein the preset distance between the entrance edge and the exit edge of the inner air foil element is less than the preset distance between the entrance edge and exit edge of the outer air foil element.

36. The square-backed vehicle air foil system as defined in claim 19 wherein each of the air foil elements extends between its entrance edge and exit edge a respective preset distance and wherein the preset distance between the entrance edge and the exit edge of the inner air foil element is less than the preset distance between the entrance edge and exit edge of the outer air foil element.

* * * * *